L. S. BACHE.
ANTIFRICTION BEARING.
APPLICATION FILED SEPT. 22, 1915.
1,234,853.
Patented July 31, 1917.
2 SHEETS—SHEET 1.
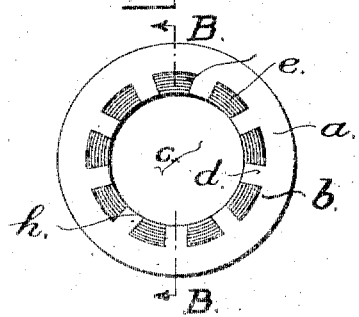
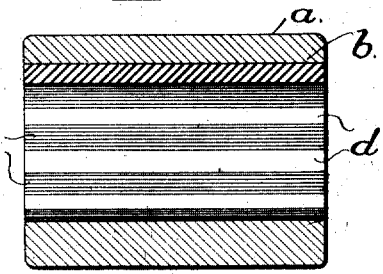
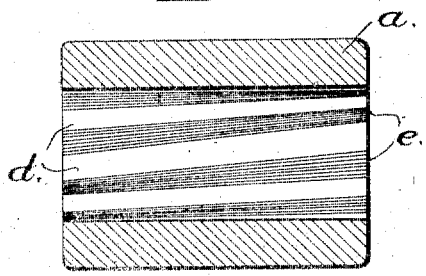
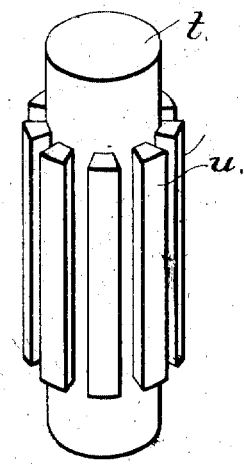
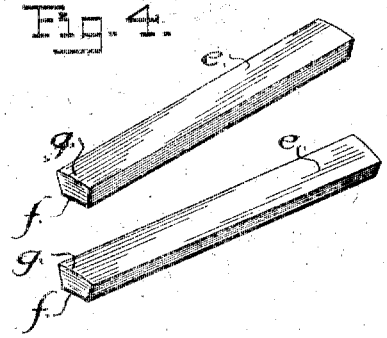
Inventor
Leigh S. Bache
By his Attorney

L. S. BACHE.
ANTIFRICTION BEARING.
APPLICATION FILED SEPT. 22, 1915.

1,234,853.

Patented July 31, 1917.
2 SHEETS—SHEET 2.

Witnesses:
Joseph J. Dougherty
Edith Remond

Inventor
Leigh S. Bache
By his Attorney

UNITED STATES PATENT OFFICE.

LEIGH S. BACHE, OF MIDDLESEX BOROUGH, NEW JERSEY, ASSIGNOR TO BOUND BROOK OIL-LESS BEARING COMPANY, OF BOUNDBROOK, NEW JERSEY, A CORPORATION OF NEW JERSEY.

ANTIFRICTION-BEARING.

1,234,853.  Specification of Letters Patent.  Patented July 31, 1917.

Application filed September 22, 1915. Serial No. 52,092.

*To all whom it may concern:*

Be it known that I, LEIGH S. BACHE, a citizen of the United States, and a resident of the Borough of Middlesex, in the county of Middlesex and State of New Jersey, have invented certain new and useful Improvements in Antifriction-Bearings, of which the following is a full, clear, and exact description, whereby anyone skilled in the art may make and use the same.

The invention relates to anti-friction bearings of a peculiar composite type, that is, a bearing having two distinctively different materials arranged to form a composite structure and producing an anti-friction bearing surface.

The main object of the invention is to provide a bearing having a shell portion which is shrunk down upon, and retains the anti-friction inserts in grooves or interlocking retainers in such a manner that there can be no displacement of the lubricating materials with reference to the main bearing shell.

The object of the invention is to provide a bearing, one portion of which may be formed with interlocking retainers for an anti-friction substance which has been introduced in units.

A further object is to provide a bearing which may be cast in a single piece with a central bore which is surrounded with pockets wider at their base than at their bearing surface and filling said pockets with inserts. The inserts are shrunk into and held firmly in the cast portion of the bearing.

It is also an object of the invention to provide a bearing consisting of a metal shell and with lubricating fiber bearing portions inserted and locked in the shell, said inserts being axially or spirally arranged with reference to the axis of the shell.

Referring to the drawings:

Figure 1 is an end view of the bearing.

Fig. 2 is a longitudinal section on the line B—B of Fig. 1.

Fig. 3 is a similar sectional view showing an angular disposition of the longitudinal retaining pockets.

Fig. 4 shows a form of insert for the straight line retainers and also an insert for the spiral or angularly formed retainer pocket.

Fig. 5 illustrates a core and mandrel upon which the metallic portion of the bearing may be formed.

Figure 6:
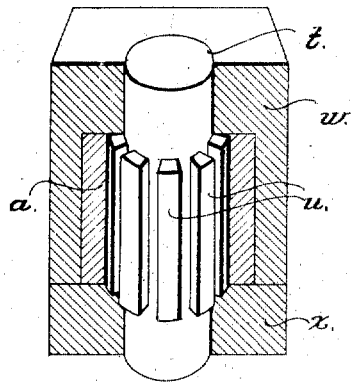
Fig. 6 illustrates a form of mold with the core or mandrel in place and the metal part of the bearing poured thereabout and broken in section.

It is admittedly old in the art to form composite bearings by using metals of different characters for the main shell and the whole or parts of the bearing surface. It is also old in the art to use impregnated fiber and wood bearings in which the material is impregnated through and through with lubricants of one form or another to provide an anti-friction surface which is always self-lubricating.

In the types of composite bearings, it has been a common practice to provide grooves of one form or another about the bearing surface or central bore which grooves have been commonly employed to hold a lubricant.

So far as known to applicant, it has been impossible to provide a perfect and practical combination of metal with fibrous self-lubricating members forming practically a homogeneous part of the whole structure. There have been many difficulties in the way of providing such a bearing. The fiber or wood could not be properly locked in the metal and the proper proportions of lubricating wood or fiber and metal could not be used and united to form a successful bearing. The invention herein described overcomes the many objections heretofore encountered and provide a complete bearing in which locking grooves may be readily formed in the metal, of a definite and accurate size and may be completely filled with inserts of impregnated fiber. The various elements when assembled and in place provide a complete bearing with a proper gage for its central bore. The exact form, number and disposition of the locking grooves is of course, one which may be determined to suit any particular type of bearing desired but in any instance, the metal is practically cast to form, with reference to the inserts.

In the accompanying drawings, *a*, denotes the metallic shell which may be of any desired type or composition of metal, bronze or Babbitt, as the latter is very well adapted for use in conjunction with the self-lubricating inserts.

The shell is formed with a series of longitudinally extending locking grooves *b*, which, as illustrated in the drawings are of the general form of a locking key in cross-section. These openings or grooves *b*, may extend axially of the bearing and in direct parallel line with the axis thereof, as illustrated in Figs. 1 and 2, or they may be angularly disposed as a spiral of long pitch, as illustrated in Fig. 3. In either case, they immediately surround the central bore *c*, and open thereinto so that there is a solid wall *d*, of broken cylindrical form between the several grooves. Fitting closely within the grooves *b*, are inserts *e*, which may be of an entirely different character of material from the body of the bearing *a*.

It has been found that inserts formed of a saturated wood or fiber such as described in my co-pending application Serial No. 845,084, filed June 15th, 1914, which has since issued as Patent No. 1,197,428, under date of September 5, 1916, are particularly efficacious. This wood or fiber is described as and consists of a material which is impregnated with waxes of various sorts having a very high melting point. It follows that the lubricant will exude from the material only to a slight degree when subjected to considerable heat. It is therefore especially advantageous to use it in the casting process defined herein. Of course, the inserts might be made of any proper lubricating material which has body and substance enough to be formed as a unit and which may be forcibly compressed into the grooves from their ends.

It will be noted that the wearing face of the inserts as at *f*, is considerably narrower than the base of the inserts as at *g*, and this provides a comparatively wide bearing face of metal *h*, between the adjacent inserts. The arrangement also has additional advantages to those of mere surface contact. An unusually strong bearing may be formed as the metal portions are not substantially weakened, being always backed up by the inserts, which, from their very key type or cross-section tend to strengthen the whole structure. Furthermore, where the lubricated wood or fiber is employed, as a sufficient amount of heat is developed, to withdraw a thin film of lubricant from the fiber, any undue friction ceases and there is no further boiling out or disturbance of the lubricant in the fibrous units. By having these substantially deep and wide at their rear ends, the heat which may be developed sufficiently to withdraw a film of lubricant is more evenly distributed throughout the mass of the inserts and throughout the intermediate bodies of metal.

Of course, Babbitt is recognized as a slippery metal but it is not sufficient in itself to prevent frictional heats. With the addition of the lubricating fibrous inserts it provides a perfect anti-friction surface. A fine film of lubricant will be drawn from the saturated inserts and passed over the intermediate metallic portions of the Babbitt and thus the whole bearing surface will be perfectly and thoroughly lubricated to just a sufficient degree to prevent further heating. Therefore, there is no undue exhaustion of the lubricating materials of the fiber.

Figure 7:
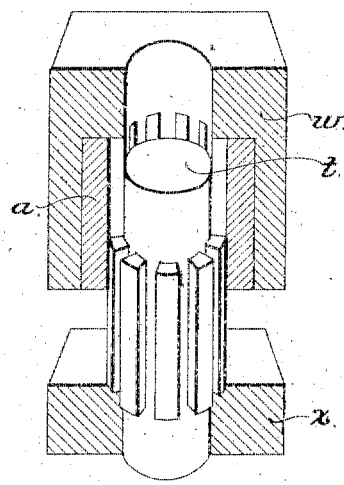
Fig. 7 illustrates the mandrel as driven out.
Figure 9:
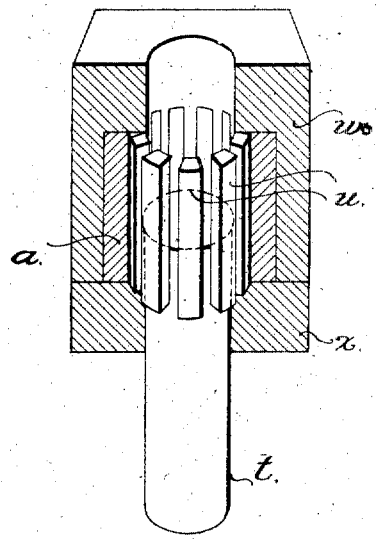
Fig. 9 is a view similar to Fig. 8 illustrating the arrangement where the inserts remain in the casting while the central bore is driven out.
Figure 8:
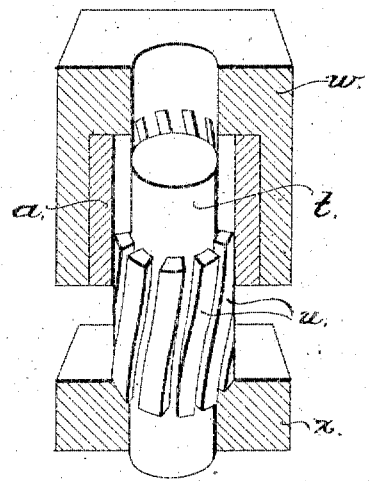
Fig. 8 is a view similar to Fig. 7 illustrating the arrangement where spiral inserts are employed.

In order to secure absolute registration and solidity of formation, it has been found, that Babbitt or any similar metal, which is used for the bearing shell, may be poured about a core such as illustrated in Figs. 5 to 7 of the drawing. This core in practice may be of wood or any suitable core material or even metal and, of course, has a central barrel portion *t*, which is surrounded by members *u* corresponding in size and shape to the grooves which it is desired to form in the finished bearing. The central core portion *v*, between the members *u*, is of the diameter which it is desired to provide for the central bore of the bushing or bearing. This core is supported in any desired and ordinary manner and is surrounded by the outer portion of the mold *w*.

When the molds are properly assembled with their cores, the metal is poured therein and before the metal has had an opportunity of thoroughly chilling and hardening, the upper end of the core-member *t*, is given a sharp blow and it is driven out through the bottom of the mold and core-support *x*. This driving of the core out of the metal before it has thoroughly congealed, routs the grooves *b*, leaving them of a uniform size and with nicely finished walls.

The inserts, as illustrated in Fig. 4, are formed from the fibrous material and by any suitable mechanism are inserted into the ends of the grooves, thus formed in the metal shell and put down under sufficient pressure to drive them snugly into the grooves so that they will completely fill said grooves. The bearing may, of course, be re-bored, ground or treated in any desired mechanical manner, although for ordinary purposes, it has been found that great accuracy can be maintained by the above described method of forming and comparatively no finishing is required, at any rate, for the interior bore. It is, of course, my theory that the molten metal when striking the core, is slightly chilled adjacent to the core and with the residual heat of the balance of the casting, it is quite feasible to drive the mandrel or core out of the casting, at the same time, routing it and giving it a perfect finish as to its central bore and surrounding retaining grooves. Thereupon, with a substantially even shrinkage, the fibrous inserts are positively and permanently bound into the structure.

It is quite possible to arrange the inserts about a cylindrical core and then cast the metal about the core and its surrounding inserts. Of course, the inserts are not firmly secured to the core, and when the cylindrical core is driven out, the inserts remain in the casting and are firmly shrunk into the pockets by the shrinkage of the metal. When so formed it is obvious that the wide latitude may be given to the formation of the pockets holding the inserts.

In effect, there is a homogeneous structure composed of two entirely different materials which could not ordinarily be united in a permanent form.

Obviously, the exact form of the grooves is not material so long as they have a locking effect on the fiber, although I have found that the form shown and described appears to have particular merit in use as bearings formed in this manner have stood most unusual tests even under the hardest wear and usage.

The invention herein described relates particularly to the bearing and has been divided out of a co-pending application Serial No. 23,617, filed April 24th, 1915, and entitled "Anti-friction bearing and method of producing same". The claims and present application relate to anti-friction bearing and are quite distinct from the method claims of the co-pending application.

What I claim as my invention and desire to secure by Letters Patent is:

1. An anti-friction bearing consisting of a metallic shell having cast therein a series of grooves extending from end to end of the shell and inserts formed of an impregnated fibrous material shrunk into and thereby locked in said grooves.

2. An anti-friction bearing consisting of a metallic shell having grooves cast therein and extending longitudinally therein and lubricating inserts formed to size from an impregnated fibrous material and adapted to be shrunk into and thereby locked in said grooves.

3. An anti-friction bearing consisting of an unbroken metallic shell having grooves cast therein and extending longitudinally thereof and lubricating inserts adapted to be shrunk into and thereby locked in said grooves, said inserts being formed of a self-lubricating impregnated fibrous material formed to fit and be locked in said grooves, as the shell shrinks upon cooling.

4. An anti-friction bearing consisting of an unbroken metallic shell having cast therein grooves extending longitudinally thereof, said grooves at their bases being wider than at the bore of the bearing and inserts of an impregnated lubricating fibrous material formed to fit and be shrunk into said grooves and adapted to be locked therein when shrunk into the grooves by the cooling of the shell.

5. As an article of manufacture, an anti-friction bearing produced with a metallic shell, having a central bore and provided with a series of impregnated fibrous lubricating inserts, said bearing produced by casting the metal of the shell in a mold about a core to form the central bore, said core having the inserts arranged about it; and driving out the core when the metal has sufficiently cooled to hold the inserts.

6. The method of producing an anti-friction bearing of the character defined which consists in providing a central core and supporting thereon a series of impregnated fibrous lubricating inserts; casting metal about the core and its inserts; driving out the central core after the metal is partially cooled; and holding the inserts in the metal by shrinkage of the metal as it cools.

7. As an article of manufacture, an anti-friction bearing produced by casting a metallic shell, having inserted therein during casting a series of impregnated fibrous lubricating inserts, said shell with its inserts being formed by casting the metal in a mold about a core sustaining the inserts, said core capable of being driven out of the mold leaving the inserts in the cast metal, whereupon as the metal cools it shrinks about and holds the inserts.

LEIGH S. BACHE.

Witnesses:
GEO. T. SMALLEY,
WM. F. JENNINGS.